United States Patent [19]

Watson

[11] Patent Number: 5,609,353
[45] Date of Patent: Mar. 11, 1997

[54] METHOD AND APPARATUS FOR VARYING THE STIFFNESS OF A SUSPENSION BUSHING

[75] Inventor: Jon R. Watson, Canton, Mich.

[73] Assignee: Ford Motor Company, Dearborn, Mich.

[21] Appl. No.: 585,069

[22] Filed: Jan. 11, 1996

[51] Int. Cl.$^6$ .................................................. B60G 11/26
[52] U.S. Cl. ................... 280/707; 188/267; 364/424.046
[58] Field of Search ..................................... 280/707, 716; 188/267; 364/424.05

[56] References Cited

U.S. PATENT DOCUMENTS

| | | | |
|---|---|---|---|
| 5,276,623 | 1/1994 | Wolfe ................................. | 364/424.05 |
| 5,277,281 | 1/1994 | Carlson et al. ......................... | 188/267 |
| 5,354,488 | 10/1994 | Shtarkman et al. ................. | 252/62.56 |
| 5,366,211 | 11/1994 | Hamada et al. ..................... | 267/140.14 |
| 5,382,373 | 1/1995 | Carlson et al. ...................... | 252/62.55 |
| 5,390,121 | 2/1995 | Wolfe ................................. | 364/424.05 |
| 5,396,973 | 3/1995 | Schwemmer et al. .................. | 280/707 |
| 5,492,312 | 2/1996 | Carlson ................................. | 188/267 |
| 5,547,049 | 8/1996 | Weiss et al. ............................ | 188/267 |

FOREIGN PATENT DOCUMENTS

| | | |
|---|---|---|
| 4-107334 | 4/1992 | Japan . |
| 4-197811 | 7/1992 | Japan . |

OTHER PUBLICATIONS

Research for New Vibration Isolation Techniques: From Hydro-Mounts to Active Mounts by Andre Gennesseaux, #931324, pp. 491–499.

An Actively Damped Passenger Car Suspension System with Low Voltage Electro-Rheological Magnetic Fluid, by Andrew Pinkos, Emil Shtarkman and Thomas Fitzgerald, #930268, pp. 87–93.

New Z-Direction Anisotropically Conductive Composites, by S. Jin, R. C. Sherwood, J. J. Mottine, T. H. Tiefel, and R. L. Opila, J. Appl. Phys. 64(10), 15 Nov. 1988, pp. 6008–6010.

Optically Transparent, Electrically Conductive Composite Medium, by S. Jin, T. H. Tiefel, R. Wolfe, R. C. Sherwood, and J. J. Mottine, Jr., Science, vol. 255, pp.446–448.

Japanese Patent Application No. Tokugan Hei349111, Patent Laid-Open Publication Number Tokkai Hei–4–266970, Patent Publication Date Sep. 22, 1992, Application Date Feb. 20, 1991.

*Primary Examiner*—Kenneth R. Rice
*Attorney, Agent, or Firm*—Gregory P. Brown

[57] ABSTRACT

A variable stiffness suspension bushing (18) for use in a suspension of a motor vehicle comprises a shaft or rod (40) connected to a suspension member (12), an inner cylinder (42) fixedly connected to the shaft or rod (40), and an outer cylinder (44) fixedly connected to a chassis member (16). A magnetorheological (MR) elastomer (48), having iron particles embedded therein, is interposed between the inner (42) and outer (44) cylinders, and a coil (54) is disposed about the inner cylinder (42). When the coil (54) is energized by electrical current provided from a suspension control module (20), a variable magnetic field is generated so as to influence the magnetorheological (MR) elastomer (48) whereby variable stiffness values of the elastomer (48) are obtained to provide the bushing (18) with variable stiffness characteristics in order to eliminate compromises heretofore necessary when using single, fixed rate bushings.

12 Claims, 3 Drawing Sheets

METHOD AND APPARATUS FOR VARYING THE STIFFNESS OF A SUSPENSION BUSHING

BACKGROUND OF THE INVENTION

1. Field of the Invention

This invention relates to a method and apparatus for varying the stiffness of a suspension bushing in a motor vehicle. More particularly, the method and apparatus are useful for selecting a bushing stiffness based upon an operating state of a transmission.

2. Disclosure Information

Vehicle ride and handling performance are strongly influenced by the operative characteristics of the various bushings utilized within the automotive vehicle suspension system. Changes in the spring rate or stiffness value of a particular bushing can directly influence a variety of operating characteristics, such as vehicle understeer, oversteer and upward squat characteristics, as well as chassis noise, vibration, and vehicle ride harshness.

For instance, it has been observed that varying the stiffness of suspension bushings on a driven axle can significantly improve the ride and shift quality as perceived by an operator. Specifically, optimal ride quality demands a suspension bushing having a relatively low spring rate. This permits the suspension to absorb disturbances in the roadway, such as tar strips, chuck holes, etc., without transmitting jarring vibrations to the occupants of the vehicle. On the other hand, optimal operation of the vehicle during a transmission shift event demands a bushing having a relatively high stiffness.

In connection with the set-up and calibration of automotive vehicle suspension systems, the spring rates of the bushings are determined by means of a lengthy trial and error process. In some cases, compromises must be made when choosing the final stiffness of a single, conventional bushing which exhibits a fixed-stiffness. This compromise has been avoided by providing a non-linear or variable rate bushing. One example of such a bushing includes fluid-filled hydrobushings.

One type of conventional, non-linear or variable rate fluid-filled hydrobushing comprises the use of electrorheological (ER) fluids incorporated within the bushing or mount. Electrorheological (ER) fluids consist of electrically polarizable particles suspended in an insulating fluid. By applying a large electric field to the electrorheological fluid, electric dipoles and higher order multipoles are induced within the suspended particles. The dipolar or multipolar particles experience mutual attraction with respect to each other whereby the particles are caused to form chains or other aligned structures that enable the fluids to exhibit solid-like mechanical properties. Removal or termination of the electric field causes the field-induced solid to revert to its initial non-induced fluid state. These dramatic, controllable changes in the rheological or mechanical properties of such bushings enables the construction of electromechanical devices or components which can be incorporated within various automotive subsystems.

Another type of conventional non-linear or variable rate fluid-filled hydrobushing comprises the use of ferrofluids or magnetorheological (MR) fluids incorporated within the bushing. Ferrofluids or magnetorheological fluids are the magnetic analogs of electrorheological fluids, and are produced by suspending magnetizable particles within a carrier fluid of low magnetic permeability, In use, a magnetic field is used to induce the desired changes in the suspension's rheological or mechanical properties through means of polarization and interparticle interactive principles of physics which are similar or analogous to those previously set forth briefly in connection with the electrorheological fluids. Consequently, the development of such magnetorheological fluids has likewise led to the construction of various electromechanical devices.

The aforenoted development of hydrobushings employing either electrorheological or magnetorheological fluids has led to the development and construction of desirable non-linear or variable rate electromechanical devices which can be effectively incorporated within the various automotive vehicle sub-systems. A major problem, however, has been encountered in connection with the employment of such hydrobushings using either electrorheological or magnetorheological fluids is that the particles dispersed or suspended within the working electrorheological or magnetorheological fluid tend to settle out of suspension over a period of time due, apparently, to the density mismatch between the particles and the host fluid. In addition, in view of the fact that such hydrobushing devices use fluids, the devices or components must necessarily be provided with appropriate seals in order to prevent any leakage of the electrorheological or magnetorheological fluid from the hydromount or hydrobushing. One further limitation on the application of the aforenoted devices is their ability to merely provide a resistive force, that is, damping.

A solution to the aforenoted problems encountered in connection with working electrorheological or magnetorheological fluids has been to embed, for example, the electrically polarizable particles within a viscoelastic solid, such as, for example, a polymer gel, in lieu of suspending or dispersing the particles within an insulating fluid. Operative characteristics of such electrorheological elastomers have proven to be as desired, that is, for example, the composite materials have exhibited solid-like properties, such as, for example, a non-zero shear modulus, even in the absence of an electrical field, and in addition, when the materials have been subjected to an electrical field, the shear modulus increases. The stiffness of such composite materials has therefore been able to be controlled electrically whereby such composite materials can be fabricated into or employed within various electromechanical devices.

Nevertheless, incorporation, fabrication and development of such composite materials in electromechanical devices in order to render such devices viable within the automotive environment, has proven problematical. For example, in order for such electrorheological elastomers to be operative, a source of high voltage is required. Therefore, an immediate concern not only arises in connection with safety procedures surrounding the generation, application, and control of such high voltage within the automotive environment, but in addition, the practical logistics of actually providing and incorporating such a source of high voltage within an automotive vehicle. Accordingly, it would be desirable to overcome the various operational disadvantages associated with the use of electrorheological (ER) elastomers.

Magnetorheological (MR) elastomers have been developed wherein magnetizable particles are dispersed within a viscoelastic solid so as to produce a composite material whose mechanical properties can be modulated by means of an applied magnetic field. In view of the fact that such magnetorheological (MR) elastomers are operative under low voltage magnetic fields, as opposed to high voltage electrical fields utilized in connection with electrorheological (ER) elastomers, the need for a source of high voltage is effectively eliminated. In particular, therefore, the voltage requirements for the magnetorheological (MR) elastomers can be readily satisfied within the automotive environment by means of the automotive vehicle electrical system.

It would be desirable to provide a method and apparatus for varying the stiffness of a suspension bushing incorporating a magnetorheological (MR) elastomers in response to specific transmission operating conditions which may be readily implemented within an motor vehicle.

SUMMARY OF THE INVENTION

A method and apparatus for varying the stiffness of a suspension bushing having a magnetorheological elastomer disposed therein has been discovered. Advantageously, this allows for improved customer satisfaction by reducing dissatisfaction associated with high torque transmission events, such as heavy acceleration and gear changing, which can result in increased noise, vibration and harshness as well as causing geometric steer. Another problem associated with high torque transmission events includes what customers perceive as vehicle lurch. This occurs when the driven wheels move longitudinally relative to the chassis under forces imposed due to heavy acceleration. The present invention solves these problems by controlling relative displacements of a longitudinal suspension member relative to a chassis member in a motor vehicle.

In accordance with the present invention, a method for controlling a variable stiffness suspension bushing comprises the steps of: communicating a transmission state signal from a transmission control module to a suspension control module; determining from the transmission state signal a desired suspension bushing stiffness and generating an electrical current in response thereto; and communicating the electrical current to an electrical coil operatively associated with the magnetorheological (MR) elastomer, thereby generating a magnetic field so as to vary the stiffness characteristics of the magnetorheological elastomer in a way related to the severity of the shift to control the relative displacement of the longitudinal suspension member with respect to the chassis member.

According to the present invention, an apparatus for providing variable stiffness suspension bushing having a magnetorheological (MR) elastomer whose stiffness is variably adjustable over a range of values by application of a controllable magnetic field. In particular, the apparatus comprises a suspension bushing shaft, an inner steel cylinder annularly surrounding the suspension bushing shaft, a magnetorheological (MR) elastomer annularly surrounding the annular inner steel cylinder, and an outer steel cylinder annularly surrounding the annular magnetorheological (MR) elastomer. An annular coil is disposed about an outer peripheral surface portion of the annular inner steel cylinder so as to be interposed between the annular inner steel cylinder and the annular magnetorheological elastomer, and the coil is adapted to be electrically connected to the automotive vehicle electrical system by means of suitable electrical leads. The elastomer includes a host material, such as natural rubber, having magnetizable particles dispersed therein. By applying suitable predetermined amounts of electrical current to the suspension bushing coil, a variable magnetic field is generated which variably controls the stiffness values of the suspension bushing. The suspension bushings stiffness can therefore adjusted in response to predetermined operational parameters of the engine and transmission.

DETAILED DESCRIPTION OF THE PREFERRED EMBODIMENT

Figure 1:
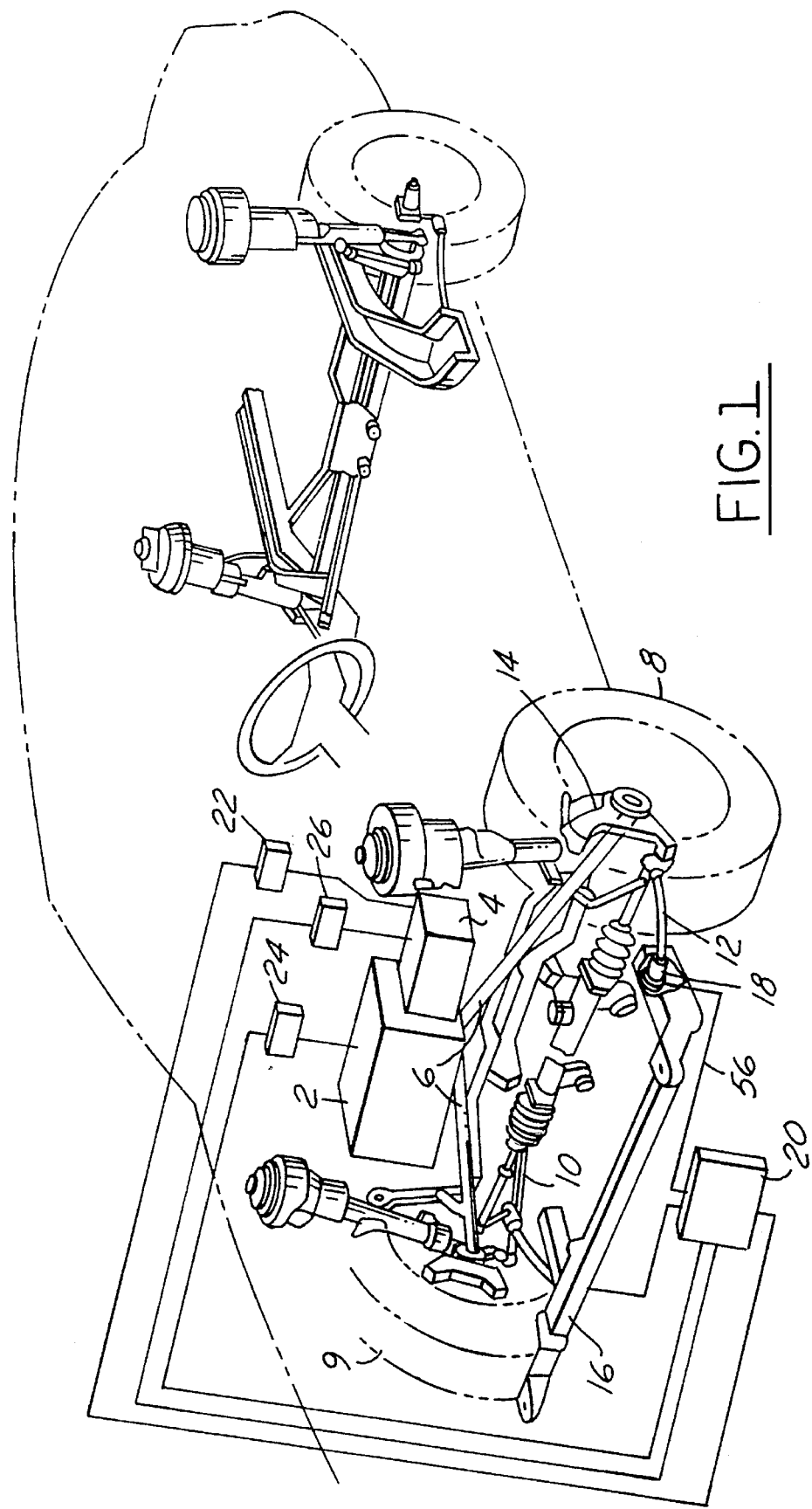
FIG. 1 is a perspective drawing of a motor vehicle including a system according to the present invention. This figure shows various components of a system embodying the present invention.

As shown in FIG. 1, a method and apparatus according to the present invention is intended for use in a motor vehicle having variable stiffness suspension bushings. The motor vehicle is equipped with an engine 2 operatively connected to a transmission 4 which in turn drives an axle 6 to rotate front wheel and tire assemblies 8, 9. This configuration is commonly recognized as front wheel drive. Those skilled in the art will appreciate in view of this disclosure that a system according to the present invention could also be utilized in motor vehicles employing rear wheel drive as well as all wheel drive.

Figure 2:
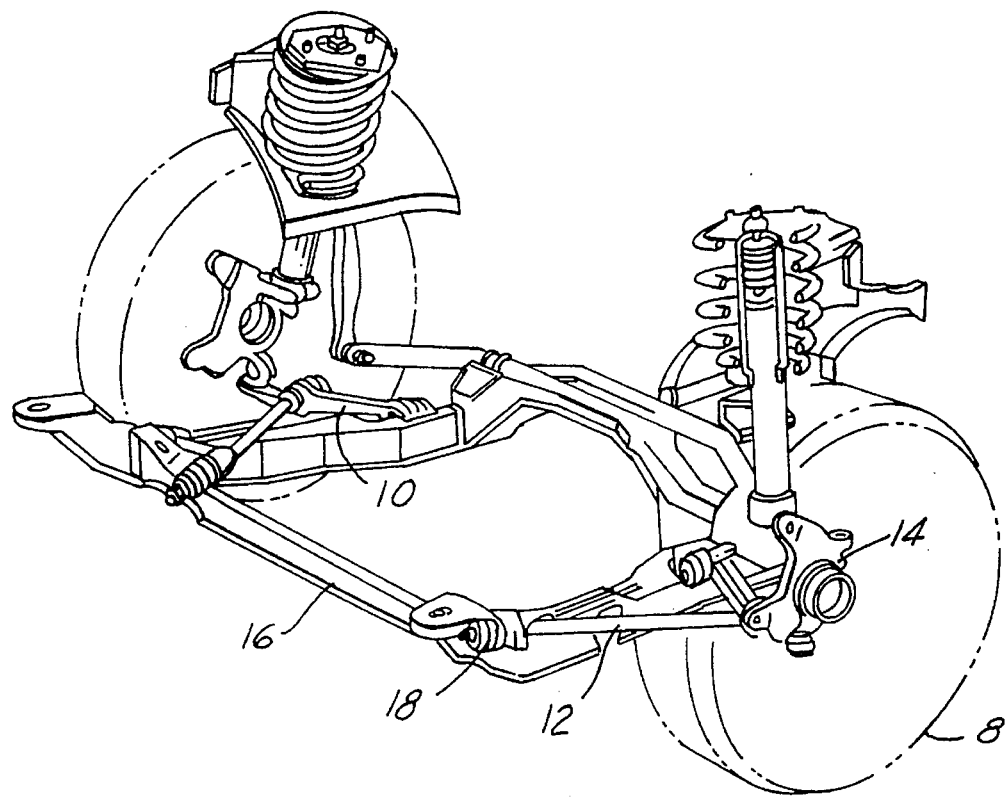
FIG. 2 is a perspective view of a front suspension of a front wheel drive motor vehicle incorporating a variable stiffness bushing in accordance with the present invention.

Referring now to FIG. 2, the front wheel drive suspension includes a substantially transverse suspension member 10 and a longitudinal suspension member 12, which together form a lower control arm assembly interconnecting a wheel support member 14 to a chassis member 16. The longitudinal suspension member 12 is oriented substantially parallel to a longitudinal axis of the motor vehicle, which generally coincides with the center line of the vehicle from front to rear. The chassis member 16 may include a subframe structure mounted on a unibody or it may simply be a component of the unibody structure. Additionally, chassis member 16 could also be a portion of the frame of a vehicle having a body on frame style structure.

A variable suspension bushing 18 according to the present invention may be advantageously interposed between the chassis member 16 and the longitudinal suspension member 12. It should be recognized that the longitudinal suspension member 12 has many structural equivalents, that is, any suspension member that provides longitudinal location of the wheel support member 14 relative to the chassis member 16.

Referring back now to FIG. 1, the component parts of a system which may be used with the present invention are illustrated. Accordingly, a suspension control module 20 receives inputs from a transmission controller 22, an engine controller 24 and a speed sensor 26. A system according to the present invention could derive input control signals from other sources, including acceleration sensors, brake sensors and the like.

Those skilled in the art will appreciate in view of this disclosure that the transmission controller 22, engine controller 24 and speed sensor 26 could comprise any of a variety of devices or systems employed in motor vehicles. It has been determined, for example, that a combined vehicle speed and distance sensor used with current model Ford Motor Company vehicles comprising a hall effect signal generator driven by a vehicle power train component, such as the transmission, is useful for providing a speed signal to a suspension control system. Similarly, the use of transmission and engine control systems also found on current Ford Motor Company vehicles is useful for communicating signals relating to transmission gear change status and engine speed and load status to the suspension control module 20.

Figure 3:
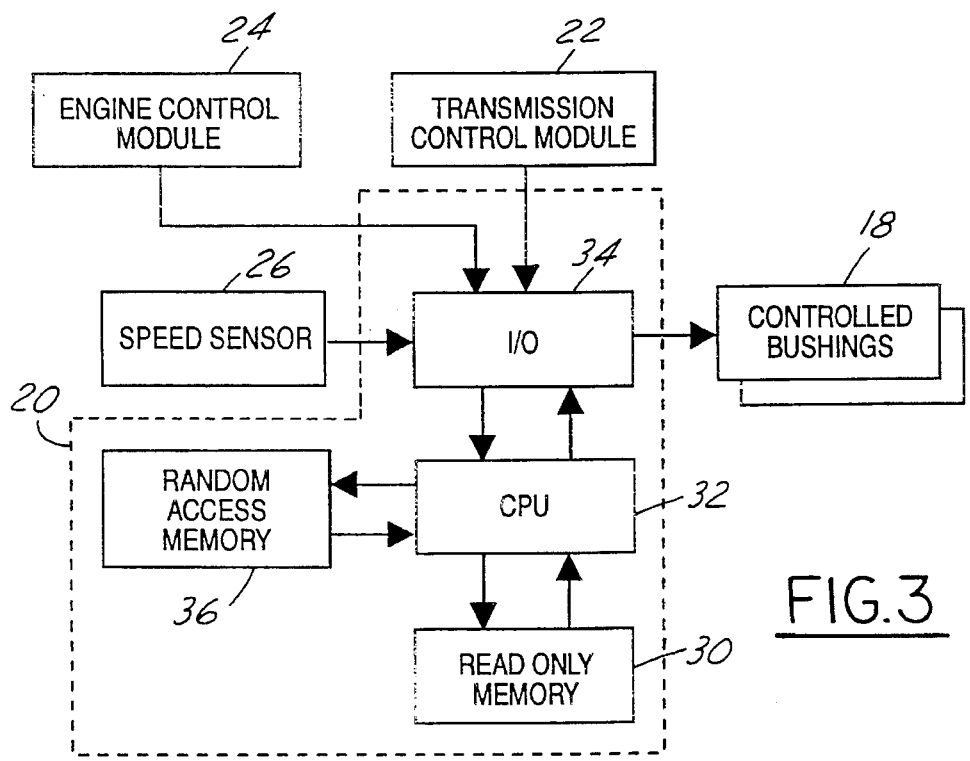
FIG. 3 is an overall system block diagram assembled in accordance with the present invention.

Referring now to FIG. 3, a suspension control module 20 for controlling a variable suspension bushing 18 will now be described. Those skilled in the art will appreciate in view of this disclosure that the processor within the suspension control module 20 and its associated peripheral equipment could be structured according to several different architectures. In a preferred embodiment, however, the processor is configured so that a control program is sequentially read for each unit command from a read-only memory (ROM) 30 which stores preset control programs. Unit commands are executed by a central processing unit (CPU) 32. The processor integrally includes an input-output circuit (I/O) 34 for exchanging data with external devices and a random access memory (RAM) 36 for temporarily holding data while the data are being processed.

The transmission control module 22 in response to requests from the suspension control module 20 provides a signal indicating a shift state. For example, on a manual transmission, the shift state might include a signal indicating that the clutch has been disengaged, thereby indicating that the operator is changing gears. Similar signals would be generated by automatic transmission controllers indicating imminent gear changes.

It may be advantageous to obtain simultaneous input from the engine controller 24 to supplement the shift state signal generated by the transmission controller 22. Together, the suspension control module could anticipate the severity of the imminent transmission event by sampling the relative power or torque being generated transmitted through the transmission, thereby indicating the degree to which the suspension controller 20 should compensate. For instance, if a shift occurs in the low gear range, under high engine output, a condition commonly known as geometric steer may occur. Stiffening the variable suspension bushings 18 in anticipation of this shift event will reduce the degree to which an operator may perceive the geometric steer. An additional input to the suspension control module 20 may include a speed signal generated by the speed sensor 26 which could be used for refined suspension bushing control. For instance, at high speeds, it may be undesirable to change the bushing stiffness. Geometry steer is merely one of many problems that may be overcome through the implementation of the present invention.

Figure 4:
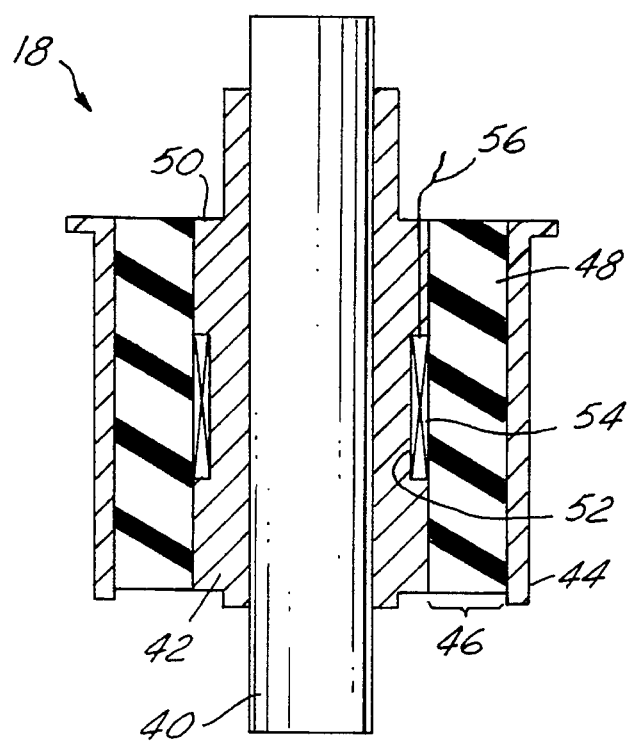
FIG. 4 is a schematic, cross-sectional view of a magnetorheological (MR) elastomer suspension bushing constructed in accordance with the principles of the invention.

Referring now to FIG. 4, suspension bushing 18 incorporating a magnetorheological (MR) elastomer is schematically illustrated and will be described in greater detail. The suspension bushing 18 includes a central shaft or rod component 12 which may comprise a shaft or bolt member 40 which is fixedly connected to the longitudinal suspension member 12. A first, radially inner, annular cylinder 42, which may be fabricated from a suitable low-carbon steel, is disposed about the shaft or bolt 12 and is fixedly attached thereto by suitable fastening means 12. A second, radially outer, annular cylinder 44, which may also be fabricated from a suitable low-carbon steel, is disposed about the first, radially inner cylinder 42 such that an annular space 46 is defined therebetween. The second, radially outer cylinder 44 is adapted to be connected to the chassis member 16. The annular space 46 is filled with a magnetorheological (MR) elastomer 48 fabricated so as to achieve the desired operating characteristics of the variable suspension bushing 18. It should be readily apparent that the suspension bushing described herein is merely an example of a suspension bushing that has been adapted to the present invention.

The magnetorheological (MR) elastomer 48 of the present invention may comprise a suitable elastomer of natural rubber, silicone, polybutadiene, polyethylene, polyisoprene, or the like. The elastomer has particulate materials embedded therein, with a preference for particulates that are magnetizable by application of a magnetic field. These include particulates having paramagnetic, ferrimagnetic, or ferromagnetic properties. Examples of preferred paramagnetic particulates include compounds comprising oxides, chlorides, sulfates, sulfides, hydrates, and other organic or inorganic compounds of cerium, chromium, cobalt, dysprosium, erbium, europium, gadolinium, holmium, iron, manganese, neodymium, nickel, praesodymium, samarium, terbium, titanium, uranium, vanadium, and yttrium. Preferred paramagnetic elements and alloys include gadolinium, various stainless steels, and other alloys of iron, nickel, manganese, and cobalt, with or without other nonmagnetic elements. Preferred ferrimagnetic particulates include magnetite ($Fe_3O_4$) and other compounds of iron and oxygen, and a third metallic component. Preferred ferromagnetic materials include iron, nickel, and cobalt, as well as alloys of these and other materials.

The size of the magnetizable particles embedded within the elastomer 20 can vary widely, such as, for example, from 10 nanometers to several millimeters. The embedding host material for the particulates can be any substantially nonmagnetic viscoelastic solid material, examples of which have been set forth hereinbefore, and the preferred materials would include those comprising either a liquid or a solid precursor that can be substantially uniformly mixed with the magnetizable particles, and subsequently processed into its final solid form through means of various thermal, chemical, optical, electrical, or other treatments or processes. More specifically, a solid precursor comprising an uncured natural rubber mixture is preferred as the embedding host material due to the advantageous operative and processing characteristics of natural rubber, such as, for example, its handling capabilities, temperature resistance properties, and durability.

Referring again to FIG. 4, the outer peripheral surface 50 of the first, radially inner, annular cylinder 42 is provided with an annular recess 52 within which an annular electromagnetic wire coil 54 is disposed. In particular, the coil 54 comprises three hundred ten (310) turns of a twenty two (22) gauge copper wire having high temperature polymeric insulation. Wire leads 56 extend from the coil 54 to a suitable source of electrical power, such as a vehicle battery, not shown. While not necessary, it is an advantage of the present invention that this coil 54 may utilized both in connection with the actual initial fabrication or construction of the suspension bushing 18 in its finalized form or state, as well as for supplemental energization of the finalized suspension bushing 18 during actual operative use of the automotive vehicle.

More particularly, the initial fabrication of the suspension bushing 18 involves coating the metal to rubber interfaces with a bonding agent to enhance adhesion therebetween. A suitable magnetorheological (MR) elastomer is then deposited within the annular space 46 defined between the first, radially inner cylinder 42 and the second, radially outer cylinder 44. The elastomer 48 is then cured at a temperature of approximately 150° C., and for a time period of between ten (10) and thirty (30) minutes, during which time a current of approximately three (3) amps is supplied to the coil 54 in order to generate a requisite magnetic field to align the particulates.

Specifically, in the preferred embodiment, the magnetic field and lines of flux extend upwardly within the inner cylinder 42, across the top of the elastomer 48, downwardly within the outer cylinder 44, and across the bottom of the elastomer 48 so as to complete the magnetic circuit. The particulates embedded within the elastomer are therefore aligned into head-to-tail arrangements comprising chains which subsequently determine the stiffness and shear modulus properties of the suspension bushing 18 both when a predetermined electrical current is applied to the coil 54 and when current is not applied to the coil 54.

The suspension control module 20 produces variable stiffness and modulus values of the bushing 18 by varying the electrical current applied to the coil 54 through leads 56, thereby varying the flux density of the generated magnetic field. The suspension may employ commonly known pulse width or pulse-frequency modulation schemes to supply the appropriate electrical current signal in response to the anticipated predetermined transmission event. It is expected that transmission events would include simple gear changes. The addition of an engine state signal allows the control signal to be proportioned to the power being transmitted through the transmission during a shift, as well as being capable of controlling high torque events independent of shift events.

Figure 5:
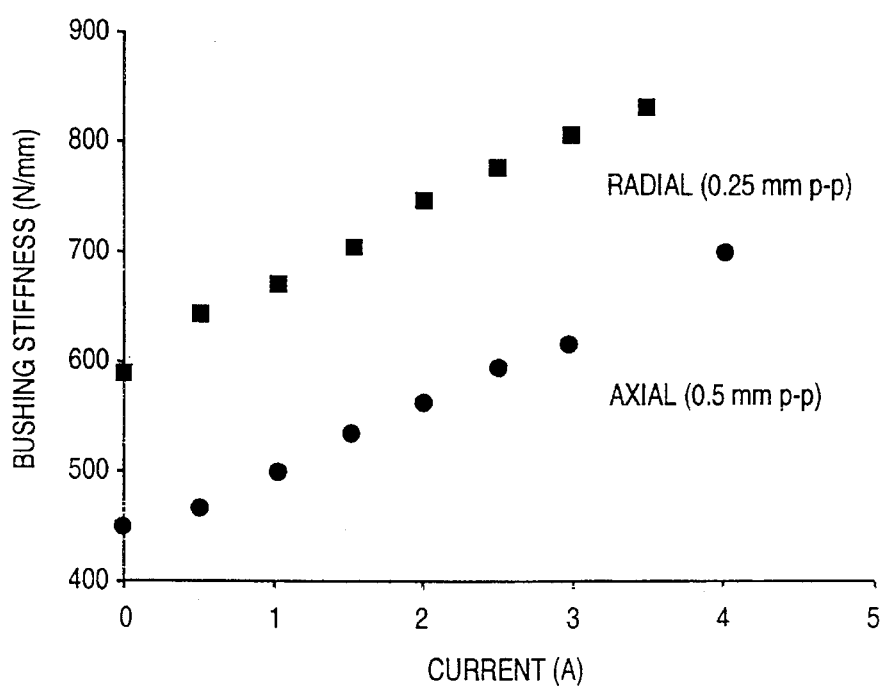
FIG. 5 is a graphical plot illustrating the bushing stiffness as a function of the applied electrical current.

Referring now to FIG. 5, the variability of a suspension bushing 18 constructed according to the principles described above was tested using a low-carbon steel shaft pinned to the radially inner cylinder 42 of the bushing 18, and mechanically oscillating the shaft and inner cylinder with varying amplitude and frequency. The force transmitted through the magnetorheological (MR) elastomer to the outer cylinder 44 was measured with a load cell. Similar apparatus was also used to measure and determine the stiffness characteristics of the bushing along a radial direction with respect to the bushing, that is, along a direction perpendicular to the longitudinal axis thereof. The longitudinal and radial test results are plotted separately upon the same graph. The axial results were achieved in connection with a peak-to-peak displacement of 0.5 mm, whereas the radial results were achieved in connection with a peak-to-peak displacement of 0.25 mm, and both sets of tests were conducted with a mechanical frequency of 0.5 Hz. Several significant conclusions can be derived from such test results.

It is firstly noted, for example, that the bushing exhibited an axial stiffness value of four hundred forty (440) Newtons/ mm when the current applied to the coil 54 was zero. This would then provide the vehicle suspension with an initial amount of stiffness which would correspond to a typical "soft" to "medium" bushing. An increased amount of stiffness can then be provided within the vehicle suspension by accordingly increasing the applied current to the coil 54. For example, as can be further appreciated from the graphical plot of FIG. 5, when the applied current is increased to four Amps, the axial stiffness characteristic of the suspension bushing is increased to approximately seven hundred (700) Newtons/mm, an increase of approximately sixty percent (60%). Similar results are also apparent in connection with the radial stiffness characteristics of the bushing. It is to be further noted that after an application to the bushing of a predetermined amount of applied current, when the applied current is subsequently terminated, the stiffness characteristic of the bushing reverts to the initial or base value in a response time that is less than one cycle of the mechanical oscillation, as determined by the inductive time constant of the device, which is several milliseconds.

It should be noted that a particular suspension bushing may have, for example, the stiffness characteristics illustrated within FIG. 5, while other bushings may be constructed with different stiffness characteristics by changing the geometrical and material parameters of the bushing. For example, altering the axial length or thickness of the bushing elastomer will result in different stiffness and modulus characteristics. Additionally, altering the material composition of the elastomer will change the stiffness characteristics. For example, the stiffness can be changed by incorporating carbon black particles in place of iron particles in the host material. Accordingly, initial stiffness values different from the graphically illustrated value of four hundred forty (440) Newtons/mm may be achieved as desired.

Various modifications and variations will no doubt occur to those skilled in the art to which this invention pertains. For example, the particular sensors and signals used in conjunction with the disclosed system may be varied from those described herein. These and all other variations which basically relay on the teachings by which this disclosure has advanced the art are properly considered within the scope of this invention as defined by the appended claims.

I claim:

1. A controllable suspension apparatus for controlling the relative displacement of a first structural component with respect to a second structural component in response to an operating state of a transmission in a motor vehicle, said controllable suspension apparatus comprising:

a first structural component;

a second structural component;

a magnetorheological elastomer interposed between and connected to said first and second structural components;

an electrical coil operatively associated with said magnetorheological elastomer for generating a variable magnetic field dependent upon an electrical current supplied to said electrical coil;

transmission control means for generating a transmission state signal; and suspension control means for generating said electrical current in response to said transmission state signal so as to vary the stiffness of said magnetorheological elastomer during a predetermined transmission event thereby controlling the relative displacement of said first structural component with respect to said second structural component.

2. A controllable suspension apparatus as set forth in claim 1, wherein:

said second structural component comprises an annular cylinder; and said first structural component comprises an annular cylinder radially spaced from and annularly surrounding said annular cylinder of said second structural component;

wherein said magnetorheological elastomer is disposed within an annular space defined between said annular cylinders of said first and second structural components.

3. A controllable suspension apparatus as set forth in claim 1, further comprising:

a chassis member;

a wheel support member for rotatably supporting a wheel and tire assembly;

a longitudinal suspension member substantially parallel to a longitudinal axis of the motor vehicle, said longitudinal suspension member interconnecting and longitudinally locating said wheel support member relative to said chassis member;

said second structural component comprises an annular cylinder and a shaft coaxially connected to said annular cylinder for connection to said longitudinal suspension member;

said first structural component comprises an annular cylinder, radially spaced from and annularly surrounding said annular cylinder of said second structural component, for connection to said chassis member; and said magnetorheological elastomer is disposed within an annular space defined between said annular cylinders of said first and second structural components.

4. A controllable suspension apparatus as set forth in claim 1, wherein said magnetorheological elastomer comprises a natural rubber host material within which iron particles are embedded.

5. A controllable suspension apparatus as set forth in claim 1, wherein said first and second structural components are fabricated from low-carbon steel.

6. A controllable suspension apparatus as set forth in claim 1, further comprising:

engine control means for generating a engine state signal for input to said suspension control means, so as to generate said electrical current in response to said transmission state signal and said engine state signal.

7. A controllable suspension apparatus for controlling the relative displacement of a longitudinal suspension member in an motor vehicle relative to a chassis member of said vehicle, said controllable suspension apparatus comprising:

a first structural component for connection to a suspension control arm of a vehicle;

a second structural component for connection to a frame component of said vehicle;

a magnetorheological elastomer interposed between and connected to said first and second structural components;

an electrical coil operatively associated with said magnetorheological elastomer for generating a variable magnetic field dependent upon an electrical current supplied to said electrical coil;

transmission control means for generating a transmission state signal; and suspension control means for generating said electrical current in response to said transmission state signal so as to vary the stiffness of said magnetorheological elastomer during a predetermined transmission event, thereby controlling the relative displacement of said first structural component with respect to said second structural component.

8. A controllable suspension apparatus as set forth in claim 7, wherein:

said second structural component comprises an annular cylinder;

said first structural component comprises an annular cylinder radially spaced from and annularly surrounding said annular cylinder of said second structural component; and said magnetorheological elastomer is disposed within an annular space defined between said annular cylinders of said first and second structural components.

9. A controllable suspension apparatus as set forth in claim 7, wherein said magnetorheological elastomer comprises a natural rubber host material within which iron particles are embedded.

10. A controllable suspension apparatus as set forth in claim 7, wherein said first and second structural components are fabricated from low-carbon steel.

11. A method of controlling a variable stiffness suspension bushing having a magnetorheological elastomer disposed therein for controlling the relative displacement of a longitudinal suspension member relative to a chassis member in a motor vehicle, said method comprising the steps of:

communicating a transmission state signal from a transmission control module to a suspension control module;

determining from said transmission state signal a desired suspension bushing stiffness and generating an electrical current in response thereto; and communicating said electrical current to an electrical coil operatively associated with said magnetorheological elastomer, thereby generating a magnetic field so as to vary the stiffness characteristics of said magnetorheological elastomer to control the relative displacement of said longitudinal suspension member with respect to said chassis member.

12. A method as set forth in claim 11, further comprising the step of communicating an engine state signal from an engine control module to said suspension control module.

* * * * *